W. A. GEIGER.
COUPLING ATTACHMENT.
APPLICATION FILED JULY 12, 1920.
1,407,939.
Patented Feb. 28, 1922.
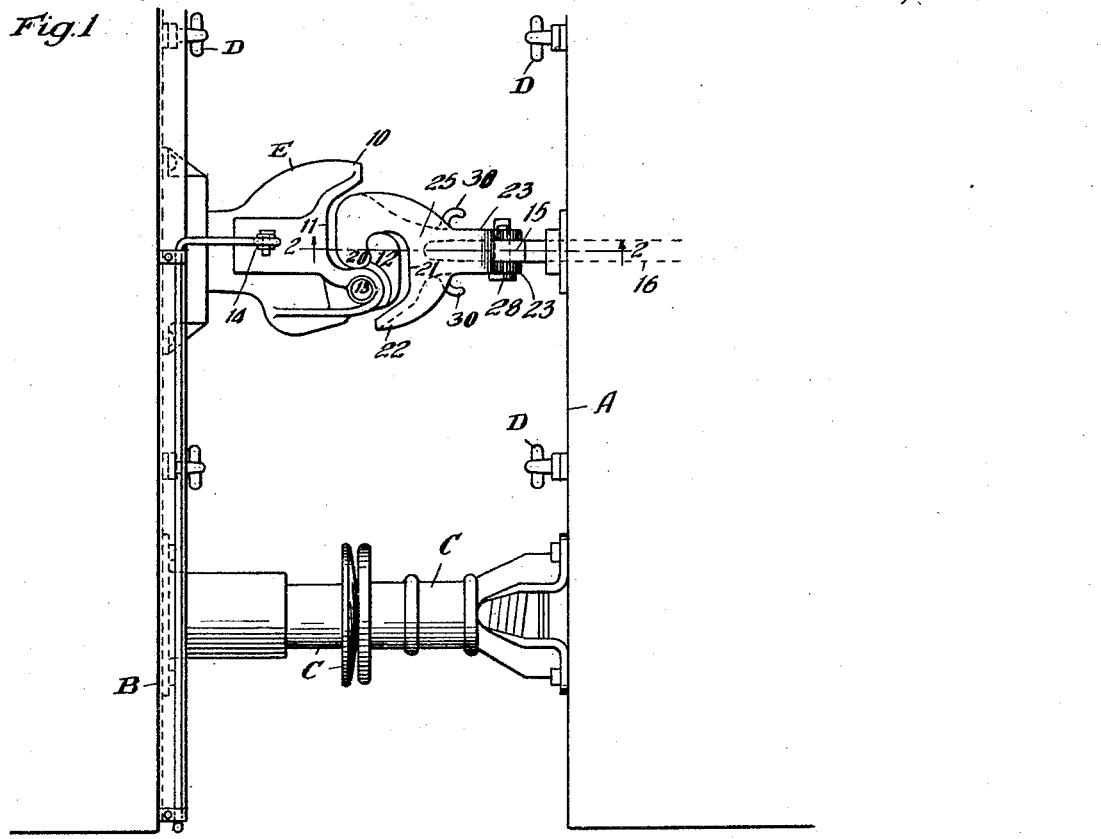
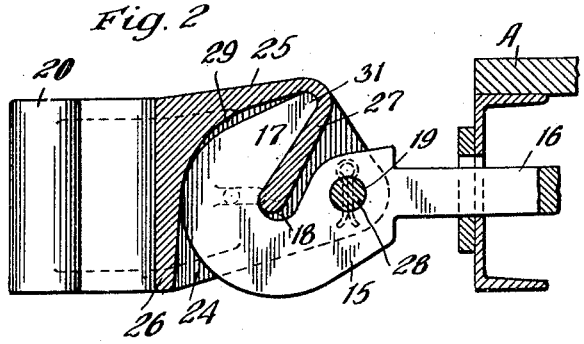
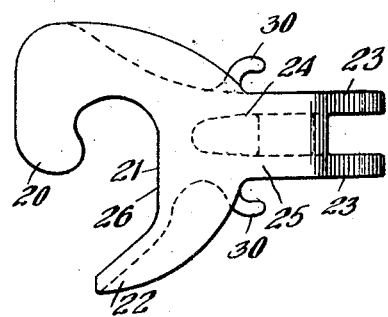
Witnesses
F. B. Townsend
Inventor
William A. Geiger
By Geo. I. Haight
His Atty.

UNITED STATES PATENT OFFICE.

WILLIAM A. GEIGER, OF CHICAGO, ILLINOIS, ASSIGNOR TO WILLIAM H. MINER, OF CHAZY, NEW YORK.

COUPLING ATTACHMENT.

1,407,939.   Specification of Letters Patent.   Patented Feb. 28, 1922.

Application filed July 12, 1920. Serial No. 395,427.

*To all whom it may concern:*

Be it known that I, WILLIAM A. GEIGER, a citizen of the United States, residing at Chicago, in the county of Cook and State of Illinois, have invented a certain new and useful Improvement in Coupling Attachments, of which the following is a full, clear, concise, and exact description, reference being had to the accompanying drawings, forming a part of this specification.

This invention relates to improvements in coupling attachments.

In foreign countries, and particularly European countries, it has been the general practice heretofore to employ couplings for railroad cars of the hook and chain variety. During the recent war, many cars of American manufacture employing automatic couplers were introduced into use on continental Europe and from which there has gradually developed a sentiment in favor of the automatic coupler in Europe. As will be evident to those skilled in the art, a long time will be required before all of the cars can be changed in their equipment, and, consequently, there will be a transition period wherein cars having automatic couplers and cars having the old style hook and link attachments will be used in the same trains.

The object of my invention is to provide coupling attachment for cars of foreign type employing a hook and link form of coupling, which attachment may be utilized in coupling to another car equipped with automatic couplers of the usual standardized American type.

In the drawings forming a part of this specification, Figure 1 is a top plan view of the end portions of two cars showing one of them equipped with my attachment and coupled to another car equipped with an automatic coupler. Figure 2 is an enlarged vertical sectional view corresponding substantially to the line 2—2 of Figure 1. And Figure 3 is a top plan view of my improved attachment shown separately.

In said drawing, the car equipped with the hook and link type of coupling is indicated at A and the other car having the automatic coupler equipment is indicated at B. As usual in foreign practice, the cars are equipped with independent buffers indicated at C—C and with chain links indicated at D—D. The car B has a coupler E of the automatic M. C. B. type, said coupler having the usual guard arm 10, jaw 11, knuckle 12, knuckle pin 13, and locking pin 14.

The car A is shown as equipped with a hook coupler indicated at 15, said hook coupler having a shank 16 adapted to be operatively associated with a draft spring in the usual manner. Said hook coupling 15 is formed, as usual, with a heavy single prong 17 and recess 18 inwardly thereof. The said coupler is also provided with a transversely extending perforation 19 in the center line of the shaft 16 and approximately at the junction of the hook proper with the shank.

The improved attachment, as shown, is preferably in the form of a single casting having a rigid knuckle 20, jaw 21, guard arm 22 and rearwardly extending spaced side flanges 23—23 adapted to straddle the hook 15. At its rear or inner end the attachment is formed with a recess 24 of substantially hook form, and within which is adapted to be accommodated the prong 17 of the hook 15. The recess 24 is defined by the side walls 23, top wall 25, vertical wall 26 and an inclined flange or rib 27, which extends into the recess 18. The side flanges 23 are perforated in alinement with the opening 19 so as to accommodate a detachable securing pin 28. The interior of the socket 24 is suitably curved, as indicated at 29, so as to facilitate the swinging down of the attachment over the prong 17 of the hook. The attachment may also be provided with hooks or lugs 30—30 on the sides thereof to facilitate coupling with another car of the hook and chain type of attachments.

In the construction as shown, it is evident that my improved attachment can be readily applied to a hook coupling of the type now commonly employed in foreign countries by merely swinging the attachment over the prong. When in the position shown in Figure 2, the attachment will rest upon the edge 31 of the prong and will also be prevented from being pulled outwardly by means of the flange or rib 27. To avoid jarring the attachment loose or preventing its loss in any manner, the pin 28 is employed. It is also apparent that, if desired, the attachment may be removed from the prong of the hook and permitted to hang downwardly, while at the same time being secured to the hook by the pin 28.

With the improved form of attachment shown, it is evident that it will permit of automatic coupling with a coupler of the automatic M. C. B. type, and when the knuckle of the latter is locked, the automatic coupler and the attachment will be securely interlocked so as to avoid separation under draft.

I have herein shown and described what I now consider the preferred manner of carrying out the invention, but the same is merely illustrative and I contemplate all changes and modifications that come within the scope of the claim appended hereto.

I claim:

An article of manufacture of the character described comprising: a casting formed at one end with a guard arm, jaw and knuckle of a form to cooperate and interlock with an automatic coupler, said casting at its other end being provided with vertically extending spaced flanges arranged to straddle the hook of a hook coupling, said flanges being perforated near their free ends to accommodate a pin extending therethrough and through the hook coupling to allow said attachment to be swung pivotally with respect to the hook coupling, said flanges being united by an integral top wall and a transversely extending web inclined to extend into the recess of the hook coupling whereby the pull is adapted to be transmitted through said web to the hook of the coupling.

In witness that I claim the foregoing I have hereunto subscribed my name this 16th day of June 1920.

WILLIAM A. GEIGER.

Witnesses:
CARRIE GAILING,
UNA C. GRIGSBY.